United States Patent [19]

Izumi

[11] Patent Number: 4,641,855
[45] Date of Patent: Feb. 10, 1987

[54] MOUNTING STRUCTURE WITH ASYMMETRICAL CUSHIONING PERFORMANCE AND VEHICLE SUSPENSION INCORPORATING THE SAME

[75] Inventor: Toshio Izumi, Toyota, Japan

[73] Assignee: Toyota Jidosha Kabushiki Kaisha, Aichi, Japan

[21] Appl. No.: 681,680

[22] Filed: Dec. 14, 1984

[30] Foreign Application Priority Data

Jul. 27, 1984 [JP] Japan .................... 59-156694

[51] Int. Cl.$^4$ ............................. B60G 11/22
[52] U.S. Cl. .................. 280/716; 267/21 R; 267/63 R
[58] Field of Search .............. 280/668, 675, 716; 267/63 R, 21 R, 21 A

[56] References Cited

U.S. PATENT DOCUMENTS 3,703,215 11/1972 Takahashi ............... 280/668
3,888,472 6/1975 Hofmann ............... 267/63 R
4,286,777 9/1981 Brown ............... 267/63 R Primary Examiner—John J. Love
Assistant Examiner—Kenneth R. Rice
Attorney, Agent, or Firm—Parkhurst & Oliff

[57] ABSTRACT

A shock and vibration absorbing mounting includes a first retainer member and a second retainer member. These retainer members are mutually coupled together and are spaced apart from one another, and have respective first and second surfaces which oppose one another. A third retainer member is located between the first and second retainer members, and has a third surface which opposes the first surface of the first retainer member and a fourth surface which opposes the second surface of the second retainer member. A first resilient member is provided between the first surface of the first retainer member and the third surface of the third retainer member, and a substantial amount of play is left between the first and the third surfaces of the first and third retainer members. And a second resilient member is provided between the second surface of the second retainer member and the fourth surface of the third retainer member, substantially continuous therebetween with substantially no play being left between the second and the fourth surfaces of the second and third retainer members. Thereby, when two members are to be coupled together, one is fixed to the combination of the first and second retainers, and the other is fixed to the third retainer; and a coupling performance with asymmetrical cushioning effect is provided between them, by the first resilient member being mounted with play while the second resilient member has substantially no play. A suspension for a vehicle is also disclosed utilizing this mounting.

6 Claims, 6 Drawing Figures

MOUNTING STRUCTURE WITH ASYMMETRICAL CUSHIONING PERFORMANCE AND VEHICLE SUSPENSION INCORPORATING THE SAME

BACKGROUND OF THE INVENTION

The present invention relates to a vehicle suspension mounting and to a vehicle suspension incorporating the same, and in particular to a vehicle suspension mounting which provides particularly good performance with regard to dampening and attenuating vibrations.

There are known various kinds of rod type suspensions for vehicles, such as for example the Macpherson strut suspension, in which a telescopic type of Macpherson strut carries a wheel of the vehicle (typically the front wheel) in a rotatable manner at its bottom portion, and is fixed to the vehicle body at its top portion, the bottom portion of said Macpherson strut being rotatable with respect to its top portion about its longitudinal axis, and a compression coil spring being mounted around said Macpherson strut so as to support the vehicle body by pushing the lower portion of the Macpherson strut and the wheel downwards with respect thereto. Now, to maintain the geometry of such a Macpherson strut suspension arrangement, a tie bar or strut is incorporated, which extends from the lower end of the Macpherson strut to which its rearward end is fixed towards the front of the vehicle while angling somewhat upwards and inwards, and which is fixed to the body of the vehicle at its forward end.

When shocks occur to the suspension which impel the wheel backwards with respect to the body of the vehicle, such as when the vehicle goes over a bump in the road or when the vehicle is sharply accelerated or decelerated, then this tie bar is put into severe tension or compression shock, and, although it is required by its rigidity to maintain the vehicle suspension geometry, it ought to be able to yield a little to this tension or compression shock in order to provide good durability and strength. Also, in order to accomodate the upwards and downwards movement of the wheel with respect to the body as the vehicle goes over these bumps or the like, the fixing of the tie bar at its forward end to the vehicle body and/or at its rearward end to the bottom of the Macpherson strut is requried to have a certain flexibility. In view of these considerations, it is known to provide the connection means for mounting the forward end of the tie bar to the body as being a cylindrical cushion rubber member, fixed to the vehicle body by some part of it such as its center, which is held between two retainer members on the tie bar. Thus, this flexible yet firm rubber member provides a cushioning effect against shock which would otherwise be transmitted through the tie bar, and also allows for a certain amount of deformation in the fixing of said tie bar at its forward end to the vehicle body, thus allowing the wheel to move up and down relative to the vehicle body. Also, by internal friction in and plastic deformation of said cusion rubber member of said mounting, it attenuates vibration and shock which are being passed through it from the vehicle wheel and suspension as a whole to the vehicle body. This vibration attenuation can be very important, because alteration of the effective length of the tie bar alters the steering geometry of the vehicle, and in particular alters the amount of toe in of the front wheels. Accordingly, if vibrations are allowed to continue for a long time in the suspension geometry, they can cause troublesome variation of vehicle steering characteristics, and if such vibrations in fact are able to build up they can adversely affect steering quality.

Now, with regard to the construction of this cusion rubber member for the mounting, and with regard to the material therefor, various problems arise. If the elastic coefficient of the rubber is high, then the attenuation of vibration and shock provided thereby is good, but much shock and vibration are transmitted to the vehicle body, and the ride becomes bad. On the other hand, if the elastic coefficient of the rubber is low, then shock and vibration are not severely transmitted to the vehicle body, and the ride becomes good, but the attenuation of vibration and shock is not very good, and build up of steering vibration can occur. Thus, it has been suggested, for example in Japanese Utility Model Publication No. 50-39543 (1975), to provide a suitable shape for the rubber member and the retainer members, so as to provide a low elastic coefficient when the axial load on the tie bar is low, and so as to provide a higher elastic coefficient as said axial load becomes higher, i.e. a so called progressive variation of elastic coefficient of the rubber member with loading on the tie bar.

However, since in the prior art the above described mounting between the forward end of the tie bar and the vehicle body including the cylindrical cushion rubber member is constructed symmetrically and has a symmetrical operational performance, i.e. because the portion of said rubber member which is compressed when the tie bar is put under tension is constructed in substantially the same way as another portion of said rubber member which is compressed when the tie bar is put under compression, thereby the progressive variation of elastic coefficient of the rubber member with loading on the tie bar is substantially the same during compression of the tie bar as during tension thereof, and thus, because over a relatively wide range of movement of the tie bar relative to the vehicle body the elastic coefficient of the rubber member is relatively low, therefore axial vibration of the tie bar may not necessarily be effectively controlled and damped.

In other words, considering for example what happens when the wheel goes over a road bump, as the wheel hits the bump the tie bar is moved in a first direction and one of the portions of the rubber member is compressed, and subsequently when the wheel leaves the bump this portion of the rubber member bounces back and expands and causes the tie bar to be bounced back in the opposite direction, to compress the other portion of the rubber member. Then this other portion of the rubber member rebounds in its turn. This happens repeatedly, and since the coefficient of elasticity of both of the rubber members is fairly low at the initial stage of compression thereof, poor dampening is provided during this reciprocating motion. Thus, axial vibration in the tie bar is not effectively damped, and the toe in of the front wheels can in some circumstances alter in a cyclic manner, thus threatening good steering characteristics. Such problems in the mounting for the tie bar to the body of the vehicle can be very troublesome, and impair good suspension system performance.

SUMMARY OF THE INVENTION

Accordingly, it is the primary object of the present invention to provide a mounting, and a suspension system incorporating the same, which avoid the above detailed problems.

It is a further object of the present invention to provide such a mounting, and a suspension system incorporating it, which can provide good vibration attenuation.

It is a further object of the present invention to provide such a mounting, and a suspension system incorporating it, which can cushion road shocks.

It is a further object of the present invention to provide such a mounting, and a suspension system incorporating it, which can ensure a good ride for the vehicle incorporating them.

It is a yet further object of the present invention to provide such a mounting, and a suspension system incorporating it including such a tie bar as described above, which ensure that axial vibration of the tie bar is always effectively controlled and damped.

It is a further object of the present invention to provide such a mounting, and a suspension system incorporating it, which provide good steering characteristics for the vehicle.

It is a further object of the present invention to provide such a mounting, and a suspension system incorporating it, which provide good suspension geometry for the vehicle.

It is a yet further object of the present invention to provide such a mounting, and a suspension system incorporating it, which ensure that the toe in of the vehicle incorporating them remains appropriate at all times.

According to an aspect of the present invention, these and other objects are accomplished by a mounting comprising: (a) a first retainer member and a second retainer member mutually coupled together and spaced apart from one another, and having respective first and second surfaces which oppose one another; (b) a third retainer member located between said first and second retainer members, and having a third surface which opposes said first surface of said first retainer member and a fourth surface which opposes said second surface of said second retainer member; (c) a first resilient member provided between said first surface of said first retainer member and said third surface of said third retainer member, with a substantial amount of play being left between said first and said third surfaces; and (d) a second resilient member provided between said second surface of said second retainer member and said fourth surface of said third retainer member, substantially continuous therebetween with substantially no play being left between said second and said fourth surfaces.

According to such a structure, when said third retainer member is moved with respect to the combination of said first and second retainer members in the direction towards said first retainer member and away from said second retainer member, then, because said play is provided said first resilient member between said first and said third surfaces, a very progressive type of elastic cushioning characteristic is provided, i.e. a relatively soft cushioning effect; while on the other hand, when said third retainer member is moved with respect to the combination of said first and second retainer members in the opposite direction, i.e. towards said second retainer member and away from said first retainer member, then, because no substantial play is provided said second resilient member between said second and said fourth surfaces a substantially non progressive type of elastic cushioning characteristic is provided, i.e. a relatively hard cushioning effect. Thus, the performance of this mounting construction is asymmetric and has an asymmetrical operational performance with regard to the two directions of compression thereof. This asymmetry ensures that good attenuation of vibrations is provided by this mounting construction. Further, shocks are well cushioned.

And, as particular special constructions for this mounting, it may be so arranged that said first resilient member substantially abuts said third surface of said third retainer member, and said play between said first and said third surfaces of said first and third retainer members is provided by a gap being left between a first face of said first resilient member and said first surface of said first retainer member; or, alternatively, that said first resilient member substantially abuts said third surface of said third retainer member and also said first surface of said first retainer member, and said play between said first and said third surfaces of said first and third retainer members is provided by a gap being defined between first and second faces of said first resilient member which oppose one another across a groove formed in said first resilient member. Also, said third retainer member may be formed as a spool shaped member having a first portion which defines said third surface, a second portion which defines said fourth surface, and a joining portion which connects said first and second portions; or alternatively as a substantially plate member having said third surface on its one side and said fourth surface on its other side.

Now, the present invention also has another aspect, wherein it provides a suspension for a vehicle wheel, comprising: (a) a control arm pivotally attached at its inboard end to said vehicle; (b) a Macpherson strut whose upper end is attached to said vehicle and whose lower end is pivotally attached to the outboard end of said control arm and rotatably bears said wheel; and (c) a tie rod, one end of which is attached to said lower end of said Macpherson strut, and the other end of which is resiliently coupled to a fixed portion of said vehicle via a mounting comprising: (d1) a first retainer member and a second retainer member mutually coupled together and spaced apart from one another and coupled to said other end of said tie rod, and having respective first and second surfaces which oppose one another; (d2) a third retainer member located between said first and second retainer members, coupled to said fixed portion of said vehicle, and having a third surface which opposes said first surface of said first retainer member and a fourth surface which opposes said second surface of said second retainer member; (d3) a first resilient member provided between said first surface of said first retainer member and said third surface of said third retainer member, with a substantial amount of play being left between said first and said third surfaces; and (d4) a second resilient member provided between said second surface of said second retainer member and said fourth surface of said third retainer member, substantially continuous therebetween with substantially no play being left between said second and said fourth surfaces.

According to this particular concept, as explained above with respect to the mounting aspect of the present invention, the performance of the mounting construction incorporated in this suspension system is asymmetric and has an asymmetrical operational performance with regard to the two directions of compression thereof dictated by compression of the tie rod or by tension thereof; and this asymmetry ensures that good attenuation of vibrations such as road vibrations is provided by this mounting construction. Further, shocks such as road shocks are well cushioned. Accordingly, this vehicle suspension system can ensure a good ride for the vehicle incorporating it. Since it is ensured that axial vibration of the tie bar is always effectively controlled and damped, this suspension system provides good steering characteristics for the vehicle. Also, the basic construction, and the sturdiness, of this suspension system ensure that it provides good suspension geometry for the vehicle. And by maintaining this suspension geometry, and by properly damping out vibration, this suspension system ensures that the toe in of the vehicle remains substantially appropriate at all times.

Further, according to a more particular aspect of the present invention, these and other objects are more particularly and concretely accomplished by such a mounting as described above, wherein said third retainer member is formed with a hole through it, and said first and second resilient members are formed as a single continuous body which is passed through said hole; or, alternatively, said first and second resilient members may be formed as separate bodies which meet one another through said hole. And, optionally, the construction may further comprise a joining member which joins together said first and said second retainer members; and each of said first and second resilient members may be formed with a hole through which said joining member passes; and said first and said second resilient members may be fixedly secured to said joining member by the defining surfaces of their said holes. This particular construction aids with maintaining the play between the first and the third surfaces of the first and third retainer members, with the interposition of the first resilient member, substantial, while also maintaining the play between the second and the fourth surfaces of the second and third retainer members, with the interposition of the second resilient member, insignificant.

And, according to a more particular aspect of the present invention, these and other objects are more particularly and concretely accomplished by such a suspension as described above, wherein said first retainer member is on the side of said third retainer member in a direction generally the same as the direction from said one end of said tie rod to said other end thereof, and said second retainer member is on the side of said third retainer member in a direction generally opposite to said direction from said one end of said tie rod to said other end thereof; and also, said tie rod may extend, from its said one end to its said other end, in a generally upwards and inboard direction relative to said vehicle. These particular characteristics are those which bring out the good effects of the present invention best.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figure; and:

DESCRIPTION OF THE PREFERRED EMBODIMENTS

Figure 2:
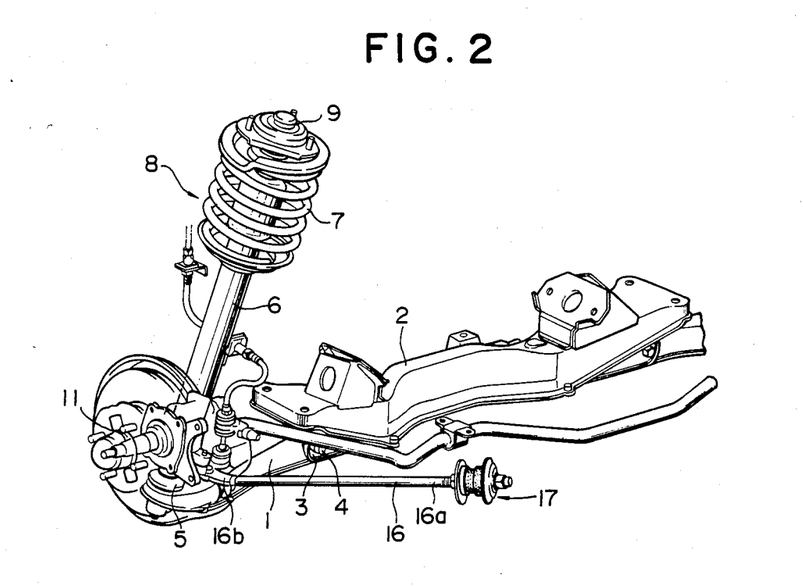
FIG. 2 is a perspective view of the preferred embodiment of the vehicle suspension of the present invention, which incorporates said first preferred embodiment of the mounting with asymmetrical cushioning performance of the present invention.
Figure 3:
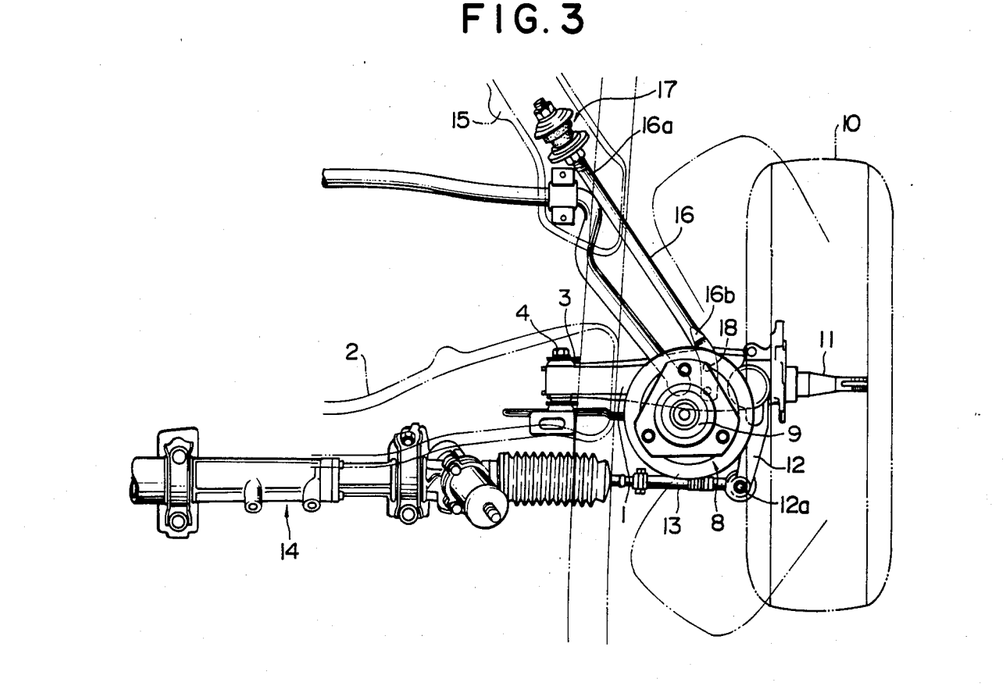
FIG. 3 is a plan view of said preferred suspension embodiment.

The present invention will now be described with reference to the preferred embodiments thereof, and with reference to the appended drawings. FIG. 2 is a perspective view of a vehicle suspension system, which is the preferred embodiment of the vehicle suspension of the present invention, and FIG. 3 is a plan view of the same. This vehicle suspension system is a Macpherson strut type suspension for a front wheel 10 (see FIG. 3) of the vehicle, and in these figures the reference numeral 1 denotes a lower control arm of the front suspension, the inboard end of which is pivoted via a rubber bush or the like to a bracket 3 fixed to a central and forward portion 2 of the frame of the vehicle by a bolt 4, the pivotal axis extending approximately along the fore and aft direction of the vehicle. The outboard end of the control arm 1 is pivoted via a ball joint 5 to the lower end of a Macpherson strut 8 which comprises a shock absorber 6 and a compression coil spring 7.

The top end of this Macpherson strut 8 is fixed to the body, not shown, of the vehicle in a rotatable and shock absorbing fashion, via an upper support 9, so that the Macpherson strut 8 can be rotated about its own longitudinal axis. And a stub axle 11 is fixedly mounted to the Macpherson strut 10 and projects substantially horizontally and outward from the vehicle; the wheel 10 is rotatably mounted on this stub axle 11. To the stub axle 11 there is fixedly attached a steering arm 12 which extends in a substantially horizontal direction towards the rear of the vehicle, and the end of this steering arm 12 is linked via a steering knuckle 12a to one end of a tie rod 13, the other end of which is linked to a rack and pinion steering device 14. Thus, when the driver of the vehicle operates the rack and pinion steering device 14, it pushes or pulls the tie rod 13 in the direction transversely to the vehicle (horizontally as seen in FIG. 3), thus pushing or pulling on the end of the steering arm 12 via the knuckle 12a, and thus rotating the wheel 10, the stub axle 11, and the Macpherson strut 8 about the central axis of said Macpherson strut; thereby the wheel 10 is steered.

A tie bar 16 extends between an outer and lower portion of the lower control arm 1 and a forward portion 15 of the frame of the vehicle and couples them together. This tie bar 16 in fact extends, from the lower control arm 1, in a direction which is forwards, inwards, and slightly upwards; and the rearward end of the tie bar 16 is rigidly attached to the control arm 1 via a bolt 18, while the forward end of the tie bar 16 is resiliently attached to the portion 15 of the vehicle frame by a mounting construction 17, which is the first preferred embodiment of the mounting with asymmetrical cushioning performance of the present invention. Thus, the tie bar 16 sustains the main fore and aft load between the vehicle wheel 10 and the body of the vehicle, and is responsible for bracing the control arm 1 and the Macpherson strut 8, thereby maintaining the position of the wheel 10 with respect to the body of the vehicle in the fore and aft direction.

Figure 1:
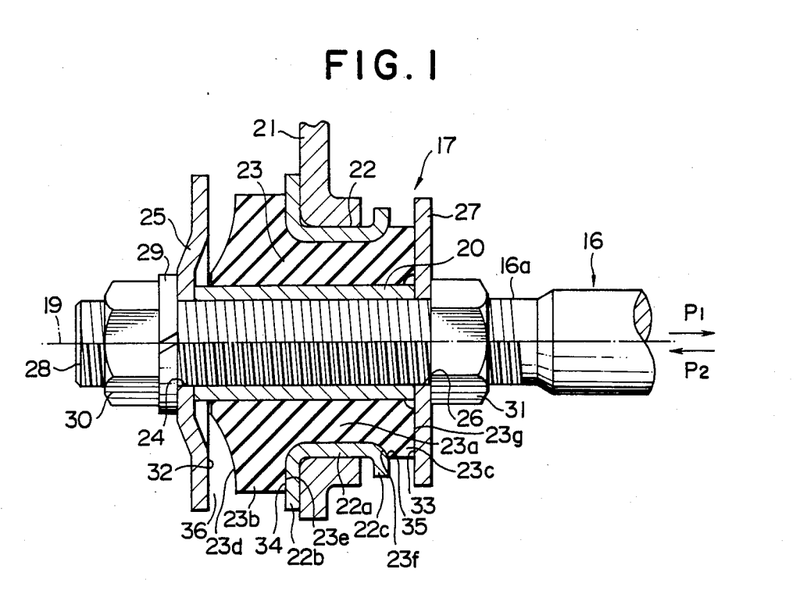
FIG. 1 is a longitudinal sectional view of a first preferred embodiment of the mounting with asymmetrical cushioning performance of the present invention.

In FIG. 1, there is shown an enlarged longitudinal sectional view of this first preferred embodiment 17 of the mounting with asymmetrical cushioning performance of the present invention, as fitted to the end of the tie bar 16. This mounting 17 is made up of an inner bobbin assembly comprising first and second end retainers 25 and 27 and an inner tubular member 20, an outer bobbin assembly comprising third and fourth end retainers 22b and 22c and an outer tubular member 22a, and a resilient member 23 fitted between them comprising a tubular resilient portion 23a and first and second resilient end portions 23b and 23c.

In detail, the first and second end retainers 25 and 27 comprised in the inner bobbin assembly are formed as disk members with holes in their centers; the first end retainer 25 is formed as slightly dished, while the second end retainer 27 is formed as planar, in the shown construction. And the inner tubular member 20 comprised in said inner bobbin assembly is a metal tube coaxially mounted on a screwed end 16a of the tie rod 16, of internal diameter substantially equal to the diameter of said screwed end 16a. The holes 24 and 26 through the first and second end retainers 25 and 27 are also of internal diameter substantially equal to the diameter of said screwed end 16a, and these retainers 25 and 27 are also fitted on the screwed end 16a of the tie rod 16, one on either side of the inner tubular member 20 and abutting its ends, the inner bobbin assembly constituted by the combination of these three members being held together by and being squeezed between two nuts 30 and 31 and a spring washer 29, also fitted on said screwed end 16a of the tie rod 16. Thus, the axial position of this inner bobbin assembly with respect to the tie rod 16 is fixed, and can be altered by adjustment of the screwed position of the nuts 30 and 31 thereon, so as to alter the effective length of said tie rod 16. In a conceivable alternative construction, the inner bobbin assembly could be abutted against a shoulder formed on the tie rod 16, but such a construction would not be adjustable in the axial direction. The first and second retainers 25 and 27 of the inner bobbin assembly have respective inwardly facing surfaces, denoted in the figure as 32 and 33.

On the other hand, the outer bobbin assembly is formed as a single integral member 22, which has an outer tubular member 22a and third and fourth end retainers 22b and 22c integrally formed therewith as disk members abutted on the ends thereof. The member 22 is fixed to a bracket portion 21 fixed to the frame of the vehicle by welding or the like, and thus the axial position of the outer bobbin assembly with respect to the vehicle body is fixed. And the third and fourth retainers 22b and 22c of the outer bobbin assembly have respective outwardly facing surfaces, denoted in the figure as 34 and 35.

The resilient member 23 is also formed generally as a bobbin, and comprises a tubular resilient portion 23a and first and second resilient end disk shaped portions 23b and 23c, all being formed integrally together out of a resilient material as for example rubber or the like. The tubular resilient portion 23a is fitted over the inner tubular member 20 of the inner bobbin assembly, and its inner cylindrical surface is securely attached to the outer surface of said inner tubular member 20 by a vulcanization process or the like, so that the inner portion of said tubular resilient portion 23a is fixed with respect to the tie rod 16 in the axial direction. The first and second resilient end disk shaped portions 23b and 23c are shaped as flanges extending from the ends of the tubular resilient portion 23a, and in the shown first preferred embodiment the first resilient end disk shaped portion 23b is thicker in axial extent than the second resilient end disk shaped portion 23c, as well as being of greater outer diameter than it. And the outer tubular member 22a of the outer bobbin assembly is press fitted over the resilient member 23, so that the outer cylindrical surface of said tubular resilient portion 23a of said resilient member 23 is kept pressed against the inner cylindrical surface of the outer tubular member 22a of the outer bobbin assembly, so as to be kept fixed in the axial direction with respect to said outer bobbin assembly and with respect to the body of the vehicle.

And, according to this construction, in the non stressed condition of the parts as shown in FIG. 1, the axially outer annular surface 23d of the first resilient end disk shaped portion 23b is not in contact with the inwardly facing surface 32 of the first retainer 25 of the inner bobbin assembly, but a certain gap 36 is left therebetween. On the other hand, the axially inner annular surface 23e of said first resilient end disk shaped portion 23b is in contact with the outwardly facing surface 34 of the third retainer 22b of the outer bobbin assembly; the axially inner annular surface 23f of the second resilient end disk shaped portion 23c is in contact with the outwardly facing surface 35 of the fourth retainer 22c of the outer bobbin assembly; and the axially outer annular surface 23g of the second resilient end disk shaped portion 23c is likewise in contact with the inwardly facing surface 33 of the second retainer 27 of the inner bobbin assembly.

Thus, to consider the behavior of this mounting construction with respect to mutual axial movement between the outer and inner bobbin assemblies thereof, if the inner bobbin assembly moves in the leftward direction in the figure with respect to the outer bobbin assembly (i.e., the tie rod 16 moves in the P2 direction as indicated by the arrow in FIG. 1, assuming that the bracket 21 attached to the body of the vehicle remains stationary), then substantially immediately the second resilient end disk shaped portion 23c of the resilient member 23 is pinched solidly between the outwardly facing surface 35 of the fourth retainer 22c of the outer bobbin assembly and the inwardly facing surface 33 of the second retainer 27 of the inner bobbin assembly, and thus a relatively strong force opposing such relative motion is immediately generated. On the other hand, if the inner bobbin assembly moves in the rightward direction in the figure with respect to the outer bobbin assembly (i.e., the tie rod 16 moves in the P1 direction as indicated by the arrow in FIG. 1), then the first resilient end disk shaped portion 23b of the resilient member 23 is not immediately pinched between the inwardly facing surface 32 of the first retainer 25 of the inner bobbin assembly and the outwardly facing surface 34 of the third retainer 22b of the outer bobbin assembly, but the presence of the gap 36 allows relatively free axial movement for a certain predetermined distance in this direction between the outer and inner bobbin assemblies. In this latter case, the only force of resistance to this movement is produced by the distortion of the tubular resilient portion 23a of the resilient member 23 by its inner cylindrical surface, which as explained above is axially fixed by vulcanization with respect to the outer surface of the inner tubular member 20 of the inner bobbin assembly and hence with respect to the tie rod 16, being pulled axially with respect to its outer cylindrical surface, which as explained above is axially fixed by press fitting with respect to the inner surface of the inner tubular member 22a of the outer bobbin assembly and hence with respect to to the body of the vehicle; but this resistance force is relatively weak as compared to the force produced by direct compression of either of the resilient end disk shaped portions 23b and 23c of the resilient member 23. On the other hand, after relative axial movement has occurred between the outer and inner bobbin assemblies in this direction (with the inner bobbin assembly moving in the rightward direction in the figure with respect to the outer bobbin assembly) through more than said certain predetermined distance, which is substantially equal to the width of the gap 36 in the unstressed state of the parts as shown in FIG. 1, then the first resilient end disk shaped portion 23b of the resilient member 23 becomes pinched between the inwardly facing surface 32 of the first retainer 25 of the inner bobbin assembly and the outwardly facing surface 34 of the third retainer 22b of the outer bobbin assembly, and thus at this time a relatively strong force opposing such relative motion starts to be generated.

This behavior of force against compression amount of the shown mounting construction will now be discussed with reference to the graph of FIG. 4, in which displacement of the mutually relatively movable elements of various mountings is shown along the horizontal axis and axial force between said elements is shown along the vertical axis. In this graph, the distance value D1 represents the amount in the P1 direction in FIG. 1 through which the inner bobbin assembly can move, before the first resilient end disk shaped portion 23b of the resilient member 23 becomes pinched between the inwardly facing surface 32 of the first retainer 25 of the inner bobbin assembly and the outwardly facing surface 34 of the third retainer 22b of the outer bobbin assembly. And the solid line in FIG. 4, consisting of portions "c", "a", and "b", represents the performance of the shown first preferred embodiment of the mounting with asymmetrical cushioning performance of the present invention. Thus it is seen that, with regard to movement of the inner bobbin assembly in the P1 direction relative to the outer bobbin assembly, at first as shown by the portion "a" of the solid line the amount of resistance generated per unit of displacement is relatively low, and this is because during this part of the travel of the inner bobbin assembly restoring force is only generated by the distortion of the tubular resilient portion 23a of the resilient member 23 with its inner cylindrical surface being pulled axially with respect to its outer cylindrical surface. On the other hand, subsequently, as shown by the portion "b" of the solid line in FIG. 4, the amount of resistance generated per unit of displacement of the inner bobbin assembly is relatively high, and this is because during this part of the travel of the inner bobbin assembly restoring force is being generated also by the pinching compression of the first resilient end disk shaped portion 23b of the resilient member 23 between the inwardly facing surface 32 of the first retainer 25 of the inner bobbin assembly and the outwardly facing surface 34 of the third retainer 22b of the outer bobbin assembly, and this disk shaped portion 23b is relatively large in cross section and also is very resilient because it is being directly compressed, in contrast to the oblique distortion to which the tubular resilient portion 23a of the resilient member 23 was previously subjected in part "a" of the solid line.

Therefore the shown first preferred embodiment of the mounting of the present invention has a distinctly progressive stress/strain characteristic with regard to movement of the inner bobbin assembly in the P1 direction with respect to the outer bobbin assembly. On the other hand, with regard to movement of the inner bobbin assembly in the opposite or P2 direction relative to the outer bobbin assembly, as shown by the portion "c" of the solid line in FIG. 4, almost at once the amount of resistance generated per unit of displacement of the inner bobbin assembly becomes relatively high, and this is because during travel of the inner bobbin assembly in this relative direction the restoring force is being generated by the pinching compression of the second resilient end disk shaped portion 23c of the resilient member 23 between the inwardly facing surface 33 of the second retainer 27 of the inner bobbin assembly and the outwardly facing surface 35 of the fourth retainer 22c of the outer bobbin assembly, and this disk shaped portion 23c is being directly compressed and also is quite large in cross section. Accordingly, the shown first preferred embodiment of the mounting of the present invention has a distinctly non progressive stress/strain characteristic with regard to movement of the inner bobbin assembly in the P2 direction with respect to the outer bobbin assembly; and hence it is seen that the behavior of this mounting construction is notably asymmetrical, as is clear from the solid line in FIG. 4. On the other hand, in the case of a conventional form of symmetrically constructed mounting, a typical performance characteristic is as indicated in FIG. 4 by the dashed line to the left of the vertical axis therein and the solid line to the right of said vertical axis; and this prior art type of performance is symmetrical. In such a prior art type of case, when the inner bobbin assembly moves in the opposite or P2 direction relative to the outer bobbin assembly, strong dampening of motion is not available until the amount of relative motion becomes equal to D2, which is substantially equal to D1.

Figure 4:
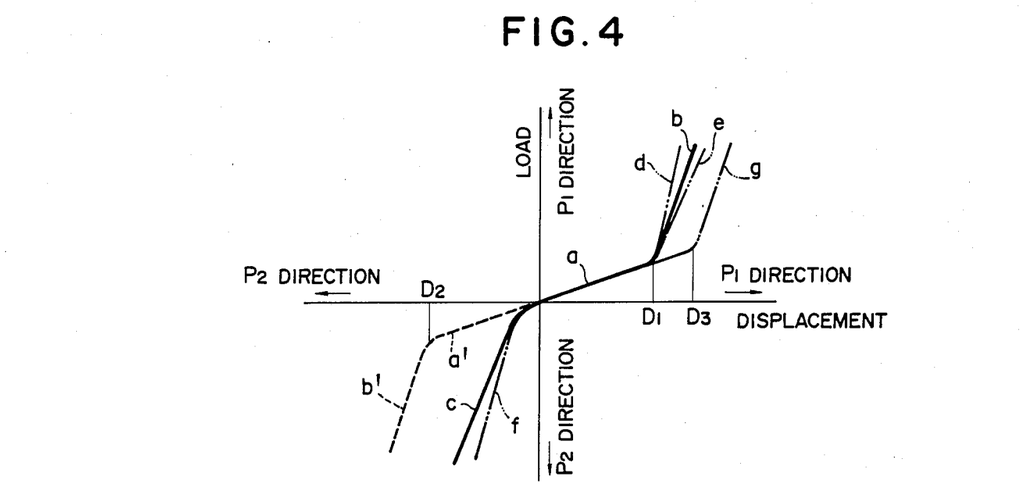
FIG. 4 is a graph, in which displacement of the mutually relatively movable elements of a mounting is shown along the horizontal axis and axial force between said elements is shown along the vertical axis, showing the performance characteristics both of prior art mountings and of mountings according to the present invention.

Thus, when the vehicle wheel 10 is pushed by a road shock or by sudden acceleration or braking of the vehicle in the rearwards direction (downwards as seen in FIG. 3), then the tie bar 16 is put into tension, i.e. is stressed in the P1 direction as seen in FIG. 1, and the operation of the mounting 17 gives a progressive elasticity and dampening performance, as shown by the portions "a" and "b" of the FIG. 4 graph. On the other hand, when the vehicle wheel 10 is pushed in the forwards direction by a road shock for example, then the tie bar 16 is put into compression, i.e. is stressed in the P2 direction as seen in FIG. 1, and the operation of the mounting 17 now gives a non progressive and somewhat hard and positive elasticity and dampening performance, as shown by the portion "c" of the FIG. 4 graph. Accordingly, it is seen that the performance of this mounting construction according to the present invention is asymmetric and has an asymmetrical operational performance with regard to the two directions of compression thereof. This asymmetry ensures that good attenuation of vibrations is provided by this mounting construction. Further, shocks are well cushioned. And, considering the operation in combination with the shown suspension system, which is the preferred embodiment of the suspension according to the present invention, this vehicle suspension system can ensure a good ride for the vehicle incorporating it. Since it is ensured that axial vibration of the tie bar is always effectively controlled and damped, this suspension system provides good steering characteristics for the vehicle. Also, the basic construction, and the sturdiness, of this suspension system ensure that it provides good suspension geometry for the vehicle. And by maintaining this suspension geometry, and by properly dampening out vibration, this suspension system ensures that the toe in of the vehicle remains substantially appropriate at all times.

In FIG. 4, the double dotted lines indicate how the performance characteristics of the mounting of the present invention can be altered by altering various of its dimensions. If the second resilient end disk shaped portion 23c of the resilient member 23 which is squeezed between the inwardly facing surface 33 of the second retainer 27 of the inner bobbin assembly and the outwardly facing surface 35 of the fourth retainer 22c of the outer bobbin assembly is made larger in the radial direction, i.e. of greater diameter, so that its elastic coefficient increases, then the inclination of the portion of the characteristic curve of the mounting to the P2 side becomes steeper, so that the portion "c" of said characteristic curve alters to be like the line "f" in FIG. 4. Similarly, if the first resilient end disk shaped portion 23b of the resilient member 23 which is squeezed between the inwardly facing surface 32 of the first retainer 25 of the inner bobbin assembly and the outwardly facing surface 34 of the third retainer 22b of the outer bobbin assembly is made of greater diameter, so that its elastic coefficient increases, then the inclination of the later portion of the characteristic curve of the mounting to the P1 side becomes steeper, so that the portion "a" of said curve alters to be like the line "d"; or, alternatively, if said first resilient disk shaped portion 23b is made of lesser diameter, so that its elastic coefficient decreases, then the inclination of said later portion of the characteristic curve of the mounting to the P1 side becomes flatter, so that the portion "a" of said curve alters to be like the line "e". These effects could be produced by increasing the diameter of the relevant portions of the inner tubular member 20 of the inner bobbin assembly, as an alternative, since it is the cross sectional area of the disk shaped portions which is important. Also, by increasing the width of the gap 36, which can for example be done by inserting a washer between the first retainer 25 and the inner tubular member 20, or by adjusting the shape of the inwardly facing surface 32 of the first retainer 25 or of the outer annular surface 23d of the first resilient end disk shaped portion 23b, the width D1 of the low resistance portion of the characteristic curve of the mounting can be increased, for instance to a value D3 as shown in FIG. 4, so that the characteristic curve is like the line "g" in that figure. Alternatively, by altering the axial dimensions of the first and/or the second resilient end disk shaped portions 23b and 23c, the characteristics of the mounting can be suitably tailored, according to requirements.

Figure 5:
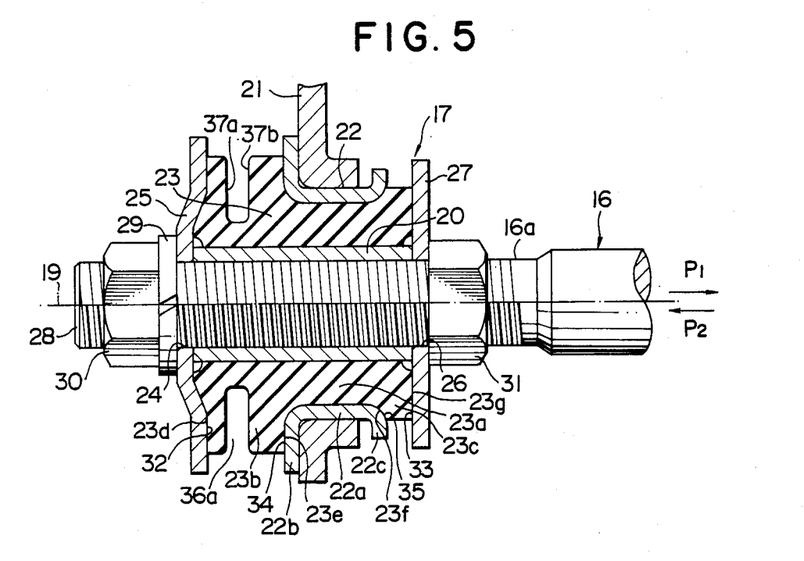
FIG. 5 is a longitudinal sectional view, similar to FIG. 1, of a second preferred embodiment of the mounting with asymmetrical cushioning performance of the present invention.

In FIG. 5, there is shown a longitudinal sectional view, similar to FIG. 1, of a second preferred embodiment of the mounting with asymmetrical cushioning performance of the present invention; and in this figure parts which correspond to part of the first preferred embodiment shown in FIG. 1 are designated by the same reference symbols. In this second preferred embodiment, rather than a gap being left between the inwardly facing surface 32 of the first retainer 25 and the outer annular surface 23d of the first resilient end disk shaped portion 23b of the resilient member 23 which confronts it, as was the case in the first preferred embodiment with the gap 36, no such gap is left but instead the inwardly facing surface 32 of the first retainer 25 and the outer annular surface 23d of the first resilient end disk shaped portion 23b of the resilient member 23 are always in contact with one another, and instead an annular groove 36a is cut in an axially middle portion of said first resilient end disk shaped portion 23b of the resilient member 23. This groove 36a has side surfaces 37a and 37b, and by the provision of the space between them the same effects are obtained as in the case of the first preferred embodiment: in particular, performance characteristics similar to those shown by the solid line in FIG. 4 with respect to said first preferred embodiment may be obtained.

Figure 6:
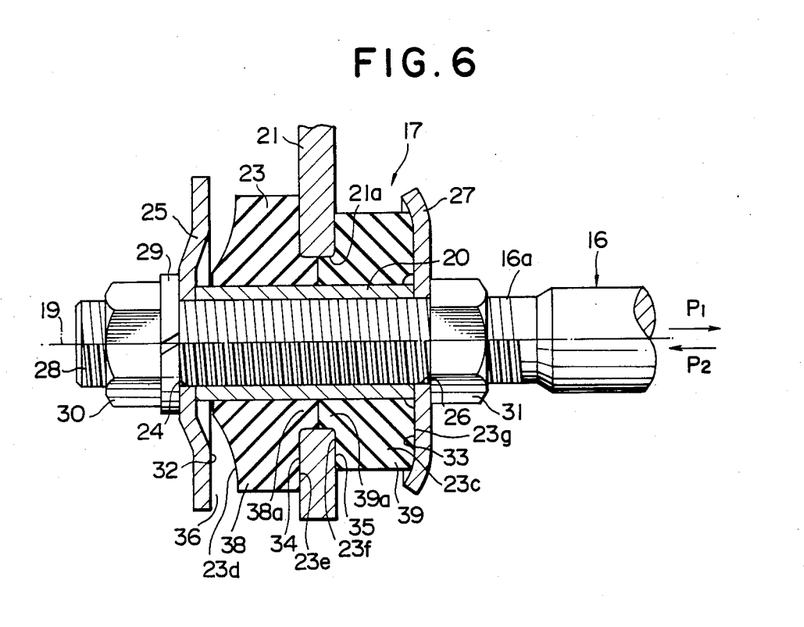
FIG. 6 is a longitudinal sectional view, similar to FIGS. 1 and 2, of a third preferred embodiment of the mounting with asymmetrical cushioning performance of the present invention.

In FIG. 6, there is shown a longitudinal sectional view, similar to FIGS. 1 and 5, of a third preferred embodiment of the mounting with asymmetrical cushioning performance of the present invention; and in this figure parts which correspond to part of the first and second preferred embodiments shown in FIGS. 1 and 5 are designated by the same reference symbols. In this third preferred embodiment, the arrangement of the gap 36 between the inwardly facing surface 32 of the first retainer 25 and the outer annular surface 23d of the first resilient end disk shaped portion 23b of the resilient member 23 which confronts it is the same as in the first preferred embodiment, so that the situation with regard to providing appropriate play is the same; but the difference from said first preferred embodiment is that the outer bobbin assembly of the first preferred embodiment is not provided; instead, the bracket 21 is directly used for being coupled to the resilient member 23, and the functions of the outwardly facing surface 34 of the third retainer 22b of the outer bobbin assembly of the first preferred embodiment and also the outwardly facing surface 35 of the fourth retainer 22c of said outer bobbin assembly are respectively provided by the left and right surfaces 34' and 36' in FIG. 6 of said bracket 21. Also, the resilient member 23 is provided in two separate pieces 38 and 39: these have respective right and left facing annular end surfaces 38a and 39a which extend into the hole in said bracket 21 between its periphery and the outer surface of the inner tubular member 20 and meet there. The inner cylindrical surface of the resilient member piece 38 is securely fixed to the outer cylindrical surface of said inner tubular member 20 by vulcanization or the like, so that they are axially securely connected together; and the other resilient member piece 39 is axially clamped between the bracket 21 and the second retainer 27 of the inner bobbin assembly. It is preferably, during assembly of this mounting construction, for the inner cylindrical surface of this resilient member piece 39 to be securely fixed to the outer cylindrical surface of said inner tubular member 20 by adhesive, and for the two resilient member pieces 38 and 39 to be mutually joined together at their contacting annular faces likewise by adhesive; but this is not essential to the shown construction. It will be easily understood by one of ordinary skill in the art, based upon the above explanations, that the same effects are obtained by this third preferred embodiment as in the case of the first preferred embodiment, described above: in particular, performance characteristics similar to those shown by the solid line in FIG. 4 with respect to said first preferred embodiment may be obtained.

Finally, as yet another variation, a construction is possible in which the groove 36a of the second preferred embodiment of FIG. 5 is employed for providing the required play in the mounting, and in which further the bracket 21 is used directly for being coupled to the resilient member 23, as in the third preferred embodiment. This variation, in other words, combines the differences from the first preferred embodiment of the second and the third preferred embodiments.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A mounting structure comprising a spool-like retainer element having a cylindrical portion and a pair of flange portions connected to opposite axial ends of said cylindrical portion, an annular cushioning member made of a rubber-like elastic material and mounted around said cylindrical portion of said spool-like retainer element, an annular retainer element positioned around said cushioning member on said cylindrical portion and between said pair of flange portions of said spool-like retainer element, said annular cushioning member having a first annular cushioning layer means for dampening a force in a first axial direction, said first layer being positioned between one of said flange portions of said spool-like retainer element and one side of said annular retainer element and a second annular cushioning layer means for dampening a force in a second axial direction opposite said first axial direction, said second layer being positioned between the other of said flange portions of said spool-like retainer element and an opposite side of said annular retainer element, only one of said first and second annular cushioning layer means being formed with an annular gap extending over a substantial radial depth thereof at an axial position located between an axial end of said one annular cushioning layer means adjacent the corresponding flange portion of said spool-like retainer element and an axially intermediate portion thereof.

2. The mounting structure according to claim 1, wherein said gap is provided at said axial end of said one annular cushioning layer means adjacent said corresponding flange portion of said spool-like retainer element.

3. The mounting structure according to claim 2, wherein said gap extends over the full radial depth of said one annular cushioning layer means.

4. The mounting structure according to claim 1, wherein said gap extends from a radially outside periphery to a radially intermediate portion of said one annular cushioning layer means.

5. The mounting structure according to claim 1, wherein said first and second annular cushioning layer means are formed from a unitary annular cushioning member.

6. The mounting structure according to claim 1, wherein said first and second annular cushioning layer means are formed as two separate annular elements abutted with one another in an axial direction.

* * * * *